No. 698,187. Patented Apr. 22, 1902.
C. V. DYER & W. S. WILLETTE.
INSECT DESTROYING MACHINE.
(Application filed Aug. 26, 1901.)
(No Model.)
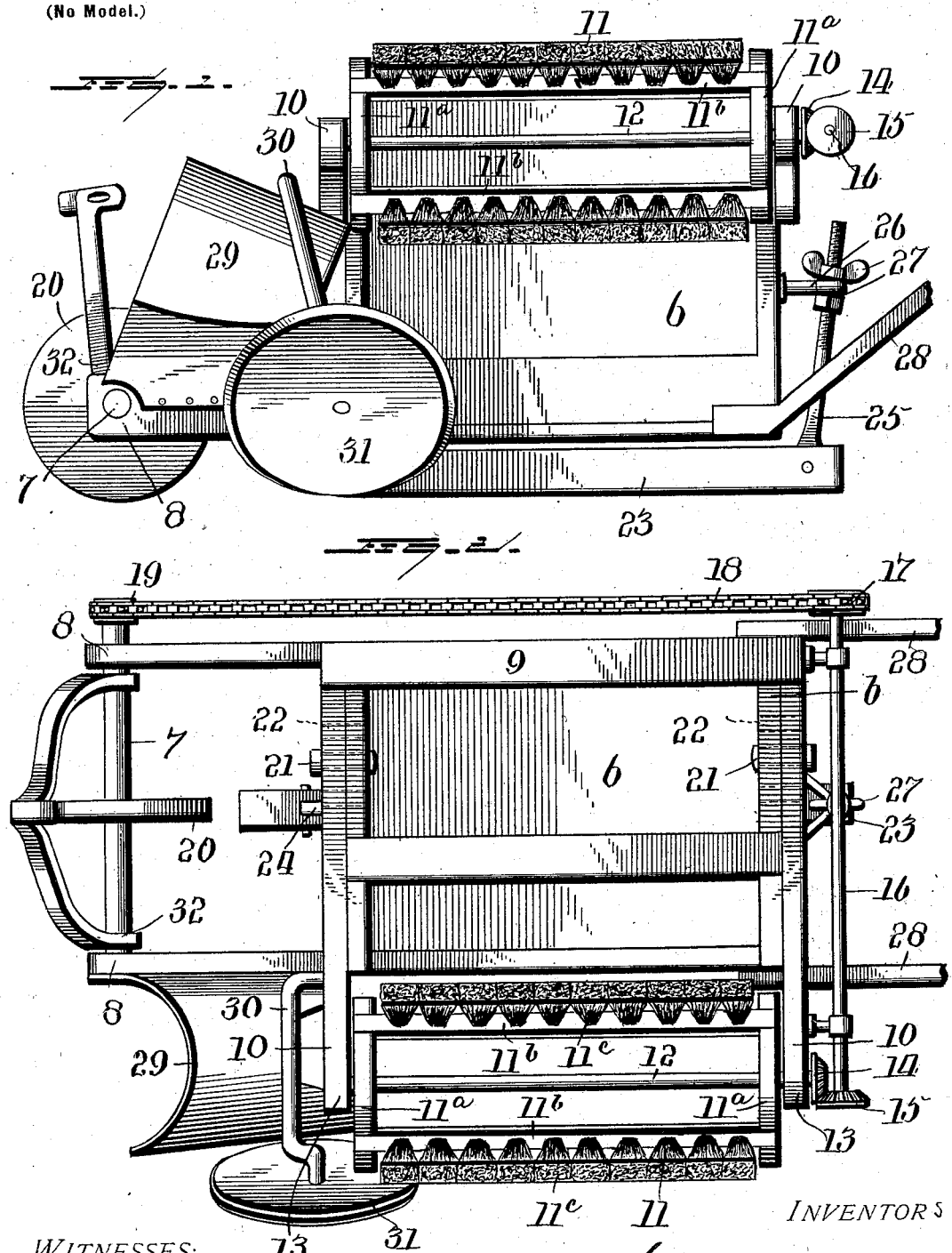
WITNESSES:
INVENTORS
BY
Attorneys

United States Patent Office.

CHARLES V. DYER AND WILLIE S. WILLETTE, OF CONROE, TEXAS.

INSECT-DESTROYING MACHINE.

SPECIFICATION forming part of Letters Patent No. 698,187, dated April 22, 1902.

Application filed August 26, 1901. Serial No. 73,305. (No model.)

*To all whom it may concern:*

Be it known that we, CHARLES V. DYER and WILLIE S. WILLETTE, citizens of the United States, residing at Conroe, in the county of Montgomery and State of Texas, have invented certain new and useful Improvements in Insect-Destroying Machines; and we do hereby declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to machines for removing and destroying insects from plants, and particularly to a machine for collecting and destroying the boll-weevil of cotton-plants.

The object of our invention is to construct a machine which will collect the said weevil and other insects from rows of cotton-plants and which will destroy the same.

The invention comprises means for gathering the branches of the plant into position to be effectively operated upon by a revolving brush which sweeps the weevils from the plant into a box carried by the machine. It is the object of our invention to do this effectively and without injury to the cotton-plants.

An embodiment of our invention is hereinafter described and is illustrated in the accompanying drawings; but it is to be understood that changes in arrangement may be made without departing from the nature of the invention.

Referring to the accompanying drawings, Figure 1 is a side elevation of the machine. Fig. 2 is a top plan view thereof.

The frame of the machine comprises a box 6, the side pieces of which are extended forwardly and are supported at their ends upon a shaft 7, which revolves in bearings 8 in the side pieces. The box has a tight bottom and is closed on three sides. The remaining side is open from the top of the box to near the bottom thereof, forming an opening through which the insects are brushed from the plants into the box. The bottom of the box is preferably formed with a tin or other water-tight lining, forming a pan to contain coal-oil or other substance to kill the bugs which drop therein. Upon the top of the box is mounted a frame 9, having lateral projections 10, which carry and support the revolving brush 11 by means of a shaft 12, on which the brush is secured, which shaft is journaled in bearings 13 in the projections. The rear end of the shaft extends beyond the bearing and is provided with a bevel-gear 14, in mesh with a bevel-gear 15, mounted on a shaft 16, which is supported in bearings and extends laterally across the rear end of the frame. The other end of the shaft beyond the frame is provided with a sprocket-wheel 17, driven by a chain 18, engaging the sprocket-wheel 19 upon the outer end of the shaft 7, said shaft having a drive-wheel 20, which rests upon the ground. The frame 9 is adjustable laterally, so that the brush may be set at a desired distance from the box to suit the size of the plants to be brushed, and this adjustment is effected by means of bolts 21, passing through the frame 9 and through one of a series of perforations 22 in the front and back walls of the box near the top edge thereof. The brush 11 may be of any suitable construction. We have illustrated two circular end plates $11^a$, joined by bars $11^b$, to which are secured the brushes $11^c$, of broom-corn or other suitable material.

The box slides upon the ground upon a runner 23, which is pivoted to a bracket 24, depending from the front of the box. The box is vertically adjustable upon this runner by means of a rod 25, the lower end of which is secured to the runner and the upper end of which is screw-threaded and passes through a bracket 26, attached to the rear wall of the box. Nuts 27 upon the rod, above and below the bracket, allow the bracket and box to be raised or lowered upon the rod and secured in the desired position. Handles 28 are secured to the box at the rear end thereof.

The machine is designed to be run along a row of cotton-plants, and in order to gather the plants and the branches thereof in position to be brushed we provide a hood 29, attached to the side piece of the box and supported by an arched bar or axle 30, the inner end of which is attached to the side piece of the box and the outer end of which is provided with and supported upon a wheel 31. This axle spans the row of plants, and the wheel is preferably inclined outwardly from the perpendicular, the effect of which is to draw and retain the machine closely along the side of the row of plants.

By the construction shown it will be seen that the brush may be adjusted laterally to suit the width of the plants and vertically upon the runner 23 to suit the height of the plants to be operated on; also, that the plants are brushed by an upstroke of the revolving brush, which more effectively rids them of the insects with the least chance of damage to the plants; also, that the plants are brought together by the hood in position to receive the full and effective sweep of the brush upon all the branches of the plant, whereby they are thoroughly ridden of the insects, which drop into the pan of kerosene and are killed thereby.

A clevis is indicated at 32, whereby a draft-animal may be attached.

It is evident that the brush may be driven from its front end, if desired, by supporting the shaft 16 on the front end of the frame 9 and by a suitable arrangement of the gearing connected thereto. We deem it advisable, however, to drive the brush from the rear end, as specified and illustrated. The rapidity of revolution of the brush may be varied by change in the bevel-gear or sprocket-wheels, as will be readily understood.

Having thus described the invention, what is claimed as new, and desired to be secured by Letters Patent, is—

1. In a machine of the character described, in combination, a box, a revolving brush, an arched axle to span a row of plants, a wheel upon the outer end thereof, and a hood adapted to gather the plants to the brush.

2. In a machine of the character described, in combination, a vertically-adjustable box, a laterally-adjustable revolving brush, and a hood adapted to gather plants to the brush.

3. In a machine of the character described, in combination, a box, a supporting-runner thereunder, means to adjust the box vertically upon the runner, a laterally-adjustable frame supported on the box, and a revolving brush mounted in the frame.

4. In a machine of the character described, in combination, a box, a supporting-runner therefor, means to adjust the box vertically relative to the runner, a laterally-adjustable frame supported on the box, a revolving brush mounted in the frame, a hood adapted to gather the plants for the brush, an arched axle adapted to span a row of plants and a wheel upon the outer end of the axle.

In testimony whereof we affix our signatures in presence of two witnesses.

CHARLES V. DYER.
WILLIE S. WILLETTE.

Witnesses:
C. T. DARBY,
W. M. CONROE.